Patented Apr. 10, 1928.

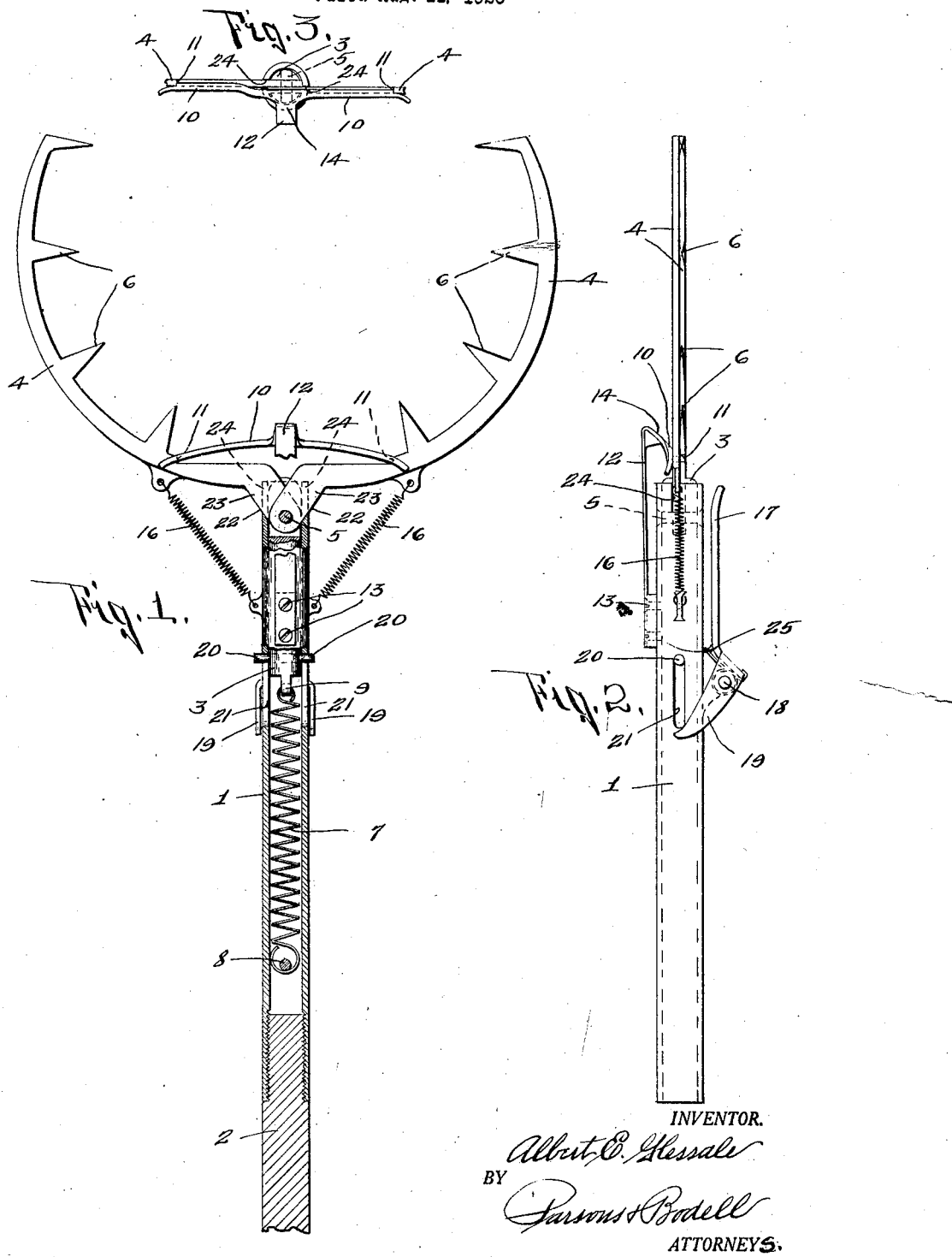
April 10, 1928.
A. E. GLESSALE
FISH GRAPPLE
Filed Aug. 11, 1926
1,665,661
INVENTOR.
Albert E. Glessale
BY Parsons & Bodell
ATTORNEYS.

1,665,661

UNITED STATES PATENT OFFICE.

ALBERT E. GLESSALE, OF SYRACUSE, NEW YORK.

FISH GRAPPLE.

Application filed August 11, 1926. Serial No. 128,585.

This invention has for its object a fish grapple which is particularly simple and economical in construction and highly efficient and durable in use.

The invention consists in the novel features and in the combinations and constructions hereinafter set forth and claimed.

In describing this invention, reference is had to the accompanying drawing in which like characters designate corresponding parts in all the views.

Figure 1 is an elevation, partly in section, of a fish grapple embodying my invention.

Figure 2 is a side elevation thereof looking to the left in Figure 1.

Figure 3 is a fragmentary plan view parts being broken away looking downwardly in Figure 1.

This fish grapple comprises, generally, a shank, a carrier movable lengthwise of the shank, a pair of jaws pivoted to the shank, the jaws and the shank having coacting surfaces arranged to close the jaws when the carrier is moved in one direction as inwardly, a spring for moving the carrier inwardly and thus effecting the closing of the jaws, a latch normally arranged to hold the jaws open against the influence of the spring tending to close them, the latch being arranged to be tripped by an object as a fish between the jaws, resetting springs acting on the jaws and a manually operable resetting member acting on the carrier to move it against the action of the spring and thus open the jaws into a position to be reengaged by the latch.

The shank 1 is here shown as tubular in general form and having a handle 2 at one end.

3 is the carrier or slide movable in the tubular shank 1.

4 are the jaws which are pivoted at 5 to the carrier 3, these jaws being arcuate in form or curved to conform to the contour of a fish, the jaws are provided with suitable prongs 6.

7 designates the spring located within the shank 1 and connected at one end as 8 thereto and at its other end at 9 to the inner end of the carrier 3, the spring being tensioned to pull the carrier 3 downwardly when unrestrained from downward movement.

10 is the latching means coacting with the jaws 4 to hold them in their open position against the tendency of the spring 7 to close the jaws. This latching means 10 is shown as a cross arm coacting at its ends with shoulders 11 on the jaws said cross arm being carried by the free end of a spring arm 12 fixed at its other end at 13 to the shank, this latch being movable laterally relatively to the direction of movement of the jaws out of engagement with the jaws when an engaging end or inclined surface 14 thereof engages a fish or other object between the jaws 4.

16 are the resetting springs acting on the jaws 4, these springs being connected at like ends to ears on the shank and at their other ends to the jaws respectively.

17 is the resetting member as a lever pivoted at 18 to suitable lugs on the shank 1 and having arms 19 arranged astride the shank 1 to coact with shoulders 20 on the carrier 3. Obviously, movement of the lever 17 from its position shown in Figure 2 will cause the arms 19 to engage the shoulders 20 on the carrier 3 when the jaws 4 are closed, and move the shoulders upwardly into the position shown in Figure 2 until the latch 10 engages the open jaws 4 and holds them in their open position. As here shown, the shoulders 20 are diametrically opposite pins on the carrier 3 or the opposite ends of a double pin or rod, which pin extends through lengthwise slots 21 in the shank 1.

The closing movement of the jaws 4 during the inward movement of the carrier 3 is effected by coacting means on the jaws and on the shank 1. In the illustrated embodiment of my invention, this means consists of cam surfaces 22 provided on inclined arms 23 at the inner ends of the jaws 4, and these arms 23 extend into lengthwise slots 24 which open through the end of the shank 1. The inclined surfaces 22 of the arms 23 engage the end walls of the slots 24 and hence during the inward movement of the carrier 3 by the spring 7, the jaws 4 are cammed or forced to swing inwardly about the pivot 5 as the carrier 3 moves under the influence of the spring 7. When the jaws are closed on the fish the arms 23 are well within the shank and the portions of the jaws next to the arms 23 overlie the end walls of the slots 24 and lock the jaws closed or from being opened by force applied to the jaws. Hence thrashings of the fish cannot open the jaws. They can be opened only by the resetting lever.

The resetting lever 17 is provided with a suitable spring 25 which holds it along side the shank 1 after the carrier 3 has been moved sufficiently to latch the jaws 4 in engagement with the latch 10.

In operation, when the angler draws the fish up along side of the boat, dock or other location where a net would ordinarily be used, he takes the grapple, which is set in open position, and reaches for the fish with the jaws embracing the fish. When the surface 14 of the latch 10 engages the fish, the latch is forced laterally out of engagement with the jaws 4 or the shoulders 11 thereof so that the spring 7 is free to react and pull the carrier 3 inwardly and close the jaws violently on the fish. When the fish is landed the jaws are opened and reset by pulling on the resetting lever 17 thus releasing the fish and resetting the device for the next fish. The movement of the lever 17 causes the arms 19 thereof to push the pins 20 and hence the carrier 3 upwardly or outwardly in the shank 1 thus carrying the jaws 4 upwardly therewith. During such upward movement the springs 16 spread the jaws until they are engaged by the latch 10.

This fish grapple is particularly advantageous in that it is particularly simple in construction and consists of a minimum number of compactly arranged parts, and although this device is called herein a fish grapple obviously it is usable or adaptable for any kind of grab hook work as for taking hold of boxes, bales, bundles, etc., to lift them.

What I claim is:

1. A fish grapple comprising a shank having a lengthwise passage therein, a carrier slidable lengthwise of the shank within the passage, a pair of jaws pivoted to the carrier, the jaws being formed with arms at the pivoted ends of the jaws and arranged at an angle to the contiguous portions of the jaws for coacting with end surfaces on the shank to close the jaws when the carrier moves inwardly lengthwise of the shank, a spring connected to the carrier for moving it inwardly lengthwise of the shank and latching means for normally holding the jaws from closing movement by the spring, said latching means having a trip associated therewith.

2. A fish grapple comprising a shank, a carrier movable lengthwise of the shank, a pair of jaws pivoted to the carrier, the jaws and the shank having coacting means acting to close the jaws when the carrier moves lengthwise of the shank in one direction, a spring for causing the carrier to make such movement, latching means for normally holding the jaws from closing movement by the spring, said latching means having a trip associated therewith and a resetting member comprising a lever pivoted to the shank and arranged to coact with the carrier to move it inwardly lengthwise of the shank and open the jaws into a position to be engaged by the latch means.

3. A fish grapple comprising a shank, a carrier movable lengthwise of the shank, a pair of jaws pivoted to the carrier, the jaws and the shank having coacting means acting to close the jaws when the carrier moves lengthwise of the shank in one direction, a spring for causing the carrier to make such movement, latching means for normally holding the jaws from closing movement by the spring, said latching means having a trip associated therewith arranged to be operated by an object as a fish between the open jaws, the carrier having a shoulder on the outside of the shank and a resetting lever pivoted on the shank and having an arm movable into engagement with said shoulder.

4. A fish grapple comprising a shank, a carrier movable lengthwise of the shank, a pair of jaws pivoted to the carrier, the jaws and the shank having coacting means acting to close the jaws when the carrier moves lengthwise of the shank in one direction, a spring for causing the carrier to make such movement, latching means for normally holding the jaws from closing movement by the spring, said latching means having a trip associated therewith arranged to be operated by an object as a fish between the open jaws, a resetting member mounted on the shank and arranged to coact with the carrier to move it inwardly lengthwise of the shank and open the jaws into a position to be engaged by the latch means and a spring for normally holding the resetting member into a position along side the shank.

5. A fish grapple comprising a shank, a carrier movable lengthwise of the shank, a pair of jaws pivoted to the carrier, the jaws and the shank having coacting means acting to close the jaws when the carrier moves lengthwise of the shank in one direction, a spring for causing the carrier to make such movement, latching means for normally holding the jaws from closing movement by the spring, said latching means having a trip associated therewith arranged to be operated by an object as a fish between the open jaws, the carrier having a shoulder on the outside of the shank, a resetting lever pivoted on the shank and having an arm movable into engagement with said shoulder, and a spring acting on the resetting lever to hold it in a position along side the shank.

6. A fish grapple comprising a shank, a carrier movable along the shank, jaws pivoted to the carrier, means for moving the carrier in one direction to close the jaws and in the other direction to open the jaws, means acting on the carrier to move it to open the jaws and a latch carried by the shank and coacting with the jaws to hold them in open position.

7. A fish grapple comprising a shank, a carrier movable along the shank, jaws pivoted to the carrier, means for moving the carrier in one direction to close the jaws and in the other direction to open the jaws, means acting on the carrier to move it to open the jaws, a latch carried by the shank and coacting with the jaws to hold them in open position, the latch being movable laterally relatively to the movement of the jaws.

8. A fish grapple comprising a shank, a carrier movable along the shank, jaws pivoted to the carrier, means for moving the carrier in one direction to close the jaws and in the other direction to open the jaws, means acting on the carrier to move it to open the jaws, a latch carried by the shank and coacting with the jaws to hold them in open position, the jaws having shoulders and a latch extending transversely of the end of the shank and coacting with said shoulders to hold the jaws in open position and a spring arm mounted at one end on the shank and carrying the latch at its other end.

9. A fish grapple comprising a tubular shank, a carrier movable in the shank, the shank being formed with diametrically opposite slots at its end, a pair of jaws having inclined portions extending through said slots and pivoted to the carrier, said inclined portions coacting with the end walls of the slots, a spring arranged within the shank and connected to the carrier tending to move the carrier inwardly into the shank and pull said inclined portions against the end walls of the slots and effect the closing of the jaws and a latch for coacting with the jaws to hold them in open position and arranged to be tripped by an object as a fish between the jaws.

10. A fish grapple comprising a tubular shank, a carrier movable in the shank, the shank being formed with diametrically opposite slots at its end, a pair of jaws having inclined portions extending through said slots and pivoted to the carrier, said inclined portions coacting with the end walls of the slots, a spring arranged within the shank and connected to the carrier tending to move the carrier inwardly into the shank and pull said inclined portions against the end walls of the slots and effect the closing of the jaws, a latch for coacting with the jaws to hold them in open position and arranged to be tripped by an object as a fish between the jaws and a resetting member carried by the shank for moving the jaws to their position against the action of the spring acting on the carrier.

11. A fish grapple comprising a hollow shank, a carrier movable lengthwise of the shank within the same, a pair of jaws pivoted to the carrier, a spring acting on the carrier to move it in one direction to close the jaws, the spring being located within the shank, the shank being also formed with lengthwise slots and the carrier with pins extending through the slots, a latch for holding the jaws in open position arranged to be tripped by an object as a fish between the jaws and a resetting lever pivoted on the shank and having arms arranged to engage said pins.

12. A fish grapple comprising a tubular shank, a carrier movable in the shank, the shank being formed with diametrically opposite slots at its end, a pair of jaws having inclined portions extending through said slots and pivoted to the carrier, said inclined portions coacting with the end walls of the slots, a spring arranged within the shank and connected to the carrier tending to move the carrier inwardly into the shank and pull said inclined portions against the end walls of the slots and effect the closing of the jaws, a latch for coacting with the jaws to hold them in open position and arranged to be tripped by an object as a fish between the jaws and a resetting member carried by the shank for moving the jaws to their position against the action of the spring acting on the carrier, the shank being also formed with lengthwise slots and the carrier with shoulders extending through the slots and the resetting member being a lever pivoted on the outer side of the shank and having an arm arranged to engage said shoulder.

13. A grapple comprising a shank, a carrier movable lengthwise of the shank, a pair of jaws pivoted to the carrier, the shank and the jaws having coacting surfaces arranged to lock the jaws in closed position when the carrier is moved to close the jaws, a spring acting on the carrier to so move it to close the jaws, a latch for holding the jaws open, and resetting means.

14. A grapple comprising a hollow shank, a carrier movable lengthwise of the shank, a pair of jaws pivoted to the carrier and having angular arms movable with the carrier into the shank, the jaws coacting at the angle of the said angular arms with the shank when the jaws are closed to hold said jaws closed, a spring located in the shank for closing the jaws, a latch for holding the jaws open and resetting means.

In testimony whereof, I have hereunto signed my name, at Syracuse, in the county of Onondaga, and State of New York, this 2nd day of August, 1926.

ALBERT E. GLESSALE.